No. 779,729. PATENTED JAN. 10, 1905.
G. E. MORRISON & T. McGRATH.
GRAIN DRIER.
APPLICATION FILED MAY 7, 1904.

Witnesses.
E. W. Jeppson.
H. D. Kilgore.

Inventors.
George E. Morrison.
Thomas McGrath
By their Attorneys.
Williamson Merchant No. 779,729.　　　　　　　　　　　　　　　　　　　　Patented January 10, 1905.

UNITED STATES PATENT OFFICE.

GEORGE E. MORRISON AND THOMAS McGRATH, OF MINNEAPOLIS, MINNESOTA.

GRAIN-DRIER.

SPECIFICATION forming part of Letters Patent No. 779,729, dated January 10, 1905.

Application filed May 7, 1904. Serial No. 206,788.

*To all whom it may concern:*

Be it known that we, GEORGE E. MORRISON and THOMAS MCGRATH, citizens of the United States, residing at Minneapolis, in the county of Hennepin and State of Minnesota, have invented certain new and useful Improvements in Grain-Driers; and we do hereby declare the following to be a full, clear, and exact description of the invention, such as will enable others skilled in the art to which it appertains to make and use the same.

Our invention has for its especial object to provide an improved grain-drier; and to such ends it consists of the novel devices and combinations of devices hereinafter described, and defined in the claims.

The invention is illustrated in the accompanying drawings, wherein like characters indicate like parts throughout the several views.

Figure 1:
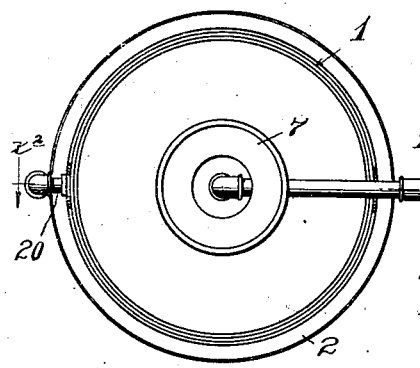
Figure 2:
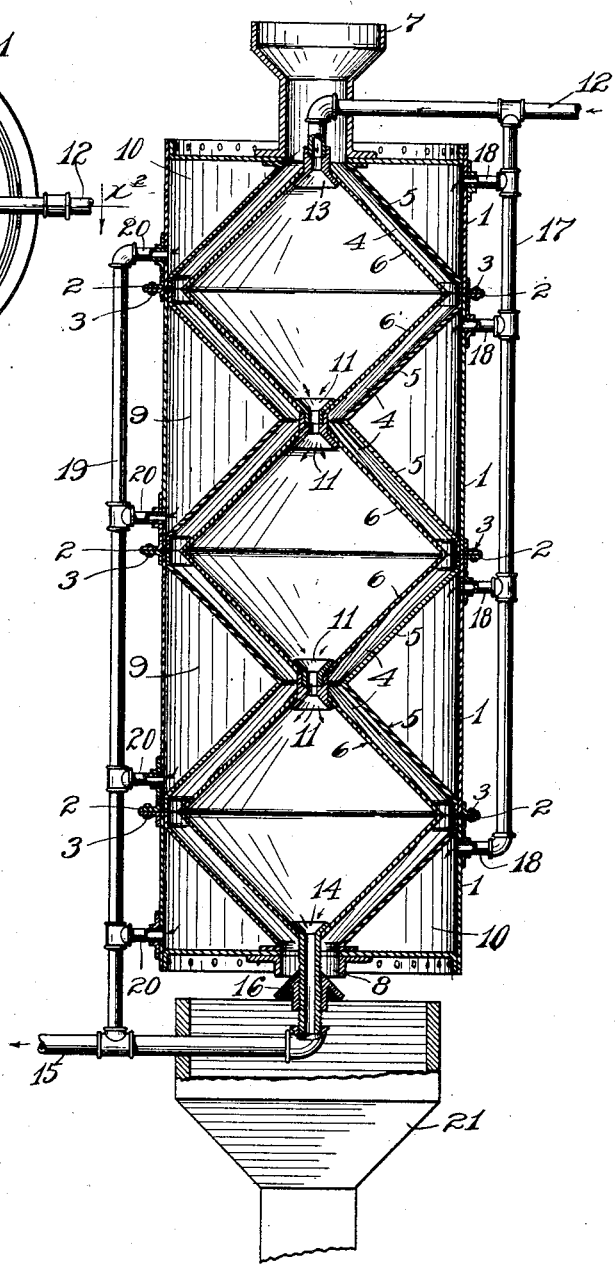

Figure 1 is a plan view of the improved drying apparatus. Fig. 2 is a vertical section taken on the line $x^2 x^2$ of Fig. 1.

The numeral 1 indicates a cylindrical vertically-disposed drum which is made up of sections having rigidly secured peripheral flanges 2, through which are passed short nutted bolts 3, that serve to detachably hold the said drum-sections together. In some instances rivets will be used instead of the bolts 3. The drum 1 may be rigidly supported by any suitable means. (Not shown.)

Within the drum 1 is an attenuated zigzag drying-channel 4, which is made up of a plurality of alternately-reversed conical sections and is formed by a plurality of conical deflecting-plates 5 and 6.

The outer conical deflecting-plates 5 at their large end are brazed or otherwise rigidly secured to the ends of the sections of the drum 1. The small end of the uppermost conical deflecting-plate 5 is rigidly secured to the upper head of the drum and communicates with the lower end of the feed-hopper 7, which hopper is supported by the said drumhead. The small lower end of the lower deflecting-plate 5 is rigidly attached to the lower head of the drum 1 and communicates with a discharge-neck 8. The abutting small ends of the intermediate conical deflecting-plates 5 are rigidly attached with steam-tight joints and coöperate with the surrounding-sections of the drum 1 to form annular steam chambers or jackets 9.

The upper and lower conical deflecting-plates 5 coöperate with the upper and lower sections of the drum 1 and the heads thereof to form annular steam chambers or jackets 10. The chambers 9 and 10 surround the attenuated drying-channel 4.

The inner conical deflecting-plates 6 are concentrically located within the outer deflecting-plates 5 and are rigidly united with steam-tight joints at their rebutting large ends, while at the rebutting small ends they are coupled together with steam-tight joints by pairs of hollow coupling-thimbles 11, the members of which preferably have screw engagement.

A steam-supply pipe 12 in the construction illustrated passes through one side of the feed-hopper 7 and communicates with the upper chamber formed by the upper pair of inner conical deflecting-plates 6 through a hollow coupling-thimble 13. A threaded sleeve 14 depends from the small end of the lower interior deflecting-plate 6 and leads into an exhaust-pipe 15. Working with screw-threaded engagement on the sleeve 14 just below the discharge-neck 8 is a conical cut-off valve 16. By vertical adjustment of this valve the size of the discharge-opening from the neck 8 may be varied at will.

The steam-supply pipe 12 has a depending branch 17, which communicates through short sections 18 with the several exterior steam-chambers 9 and 10.

The exhaust-pipe 15 has a vertically-extended branch 19, which communicates through short sections 20 with the said chambers 9 and 10.

The inlet-pipe sections 18 preferably open into the upper portions of the respective chambers 9 and 10, while the pipe-sections 20 open from the lower portions of the respective chambers 9 and 10.

The numeral 21 indicates a hopper which is located below the drum 1 in position to receive the dried grain from the discharge-neck 8.

The wheat or other material which is to be dried is fed into the upper end of the drying-channel 4 from the feed-hopper 7, and when the discharge-valve 16 is properly adjusted with respect to the feed or supply of the grain the grain will entirely fill up the said drying-channel 4. By adjustment of the valve 16 the rate of discharge of the dried grain from the channel 4 may be varied, and it is of course evident that the rate of discharge will regulate the time during which the grain will remain in the said drying-channel, and hence the length of time that will be subjected to a drying process.

The cross-section of the drying-channel 4, it will be noted, is alternately increased and decreased at regular intervals, so that the particles of grain are continuously caused to change their relative positions in passing through the said channel, and by this means all particles of the grain are caused to come into direct contact with the heated surfaces of the deflecting-cones 5 and 6. Hence by this apparatus the grain will be evenly dried throughout.

The vertical length of the apparatus may be increased or decreased by adding an additional section thereto or by removing a section therefrom. This of course is made possible by the fact that the sections of the case 1 are detachably secured together, each being provided with one or more of the outer deflecting-cones 5 and by the further fact that the inner steam chambers or shells made up of the inner deflecting-cones 6 are also detachably connected. It will be further noted that the pipes 17 and 19 are made up of sections corresponding to the sections of the drum 1. This also facilitates the separation of the sections of the apparatus.

From what has been said it will of course be understood that the apparatus described is capable of modification within the scope of our invention as herein set forth and claimed. The efficiency of the apparatus has been demonstrated in practice. As is evident in some instances hot air or other hot fluid may be employed instead of steam as the heating medium.

We claim—

1. A drier of the class described, made up of a plurality of detachable steam-jacketed sections placed one over the other, and having an attenuated drying-channel made up of a plurality of alternately-inclined sections, substantially as described.

2. A drier of the class described, made up of a plurality of detachable sections placed one over the other and having an attenuated drying-channel made up of a plurality of alternately-reversed cone-shaped sections, steam-jacketed inside and outside, substantially as described.

3. In a drier of the class described, the combination with a drum made up of sections and provided with a plurality of alternately-reversed deflecting-cones, secured to the several drum-sections and coöperating therewith to form a plurality of steam-jackets, of a plurality of alternately-reversed interior deflecting-cones, forming interior steam-chambers, said interior chambers being detachably secured together and being spaced from the outer deflecting-plates, and coöperating therewith to form an attenuated drying-channel, having alternately-reversed conical sections, substantially as described.

In testimony whereof we affix our signatures in presence of two witnesses.

GEORGE E. MORRISON.
THOMAS McGRATH.

Witnesses:
R. C. Mabey,
F. D. Merchant.